(12) United States Patent
Kawasaki et al.

(10) Patent No.: US 6,340,865 B2
(45) Date of Patent: Jan. 22, 2002

(54) FLUORESCENT DISPLAY DEVICE AND METHOD FOR DRIVING SAME

(75) Inventors: Hiroaki Kawasaki; Yukio Ogawa, both of Chiba (JP)

(73) Assignee: Futaba Denshi Kogyo Kabushiki, Chiba (JP)

(*) Notice: Subject to any disclaimer, the term of this patent is extended or adjusted under 35 U.S.C. 154(b) by 0 days.

(21) Appl. No.: 09/735,730

(22) Filed: Dec. 13, 2000

(51) Int. Cl.$^7$ .................................................. G09G 3/10
(52) U.S. Cl. ............................... 315/169.1; 315/169.3; 313/496; 313/495; 313/497
(58) Field of Search .................... 315/169.1, 169.3, 315/169.4, 366; 313/496, 495, 497, 503, 529

(56) References Cited

U.S. PATENT DOCUMENTS

| | | | | |
|---|---|---|---|---|
| 4,595,862 A | * | 6/1986 | Morimoto et al. | 315/169.4 |
| 5,277,784 A | * | 1/1994 | Woo | 205/109 |
| 5,619,098 A | * | 4/1997 | Toki et al. | 313/496 |
| 6,236,156 B1 | * | 5/2001 | Ito | 313/495 |

* cited by examiner

Primary Examiner—Don Wong
Assistant Examiner—Tuyet T. Vo
(74) Attorney, Agent, or Firm—Roseman & Colin, LLP.

(57) ABSTRACT

In a fluorescent display device having control electrodes and anodes, each anode having an anode electrode and a fluorescent layer formed thereon, a filament is installed between the control electrodes and the anode electrodes. When an anode is selected to be turned on to emit light, a first voltage (V1) is applied to the filament, a second voltage (V2) is applied to the selected anode and a third voltage (V3) is applied to a control electrode facing the selected anode, wherein V2 is greater than V1 and V3 is equal to or greater than V1. When a voltage applied to a target control electrode is lower than a voltage applied to the filament by more than a predetermined voltage difference, an anode facing the target control electrode is not turned on to emit light even when V2 is applied thereto.

4 Claims, 9 Drawing Sheets

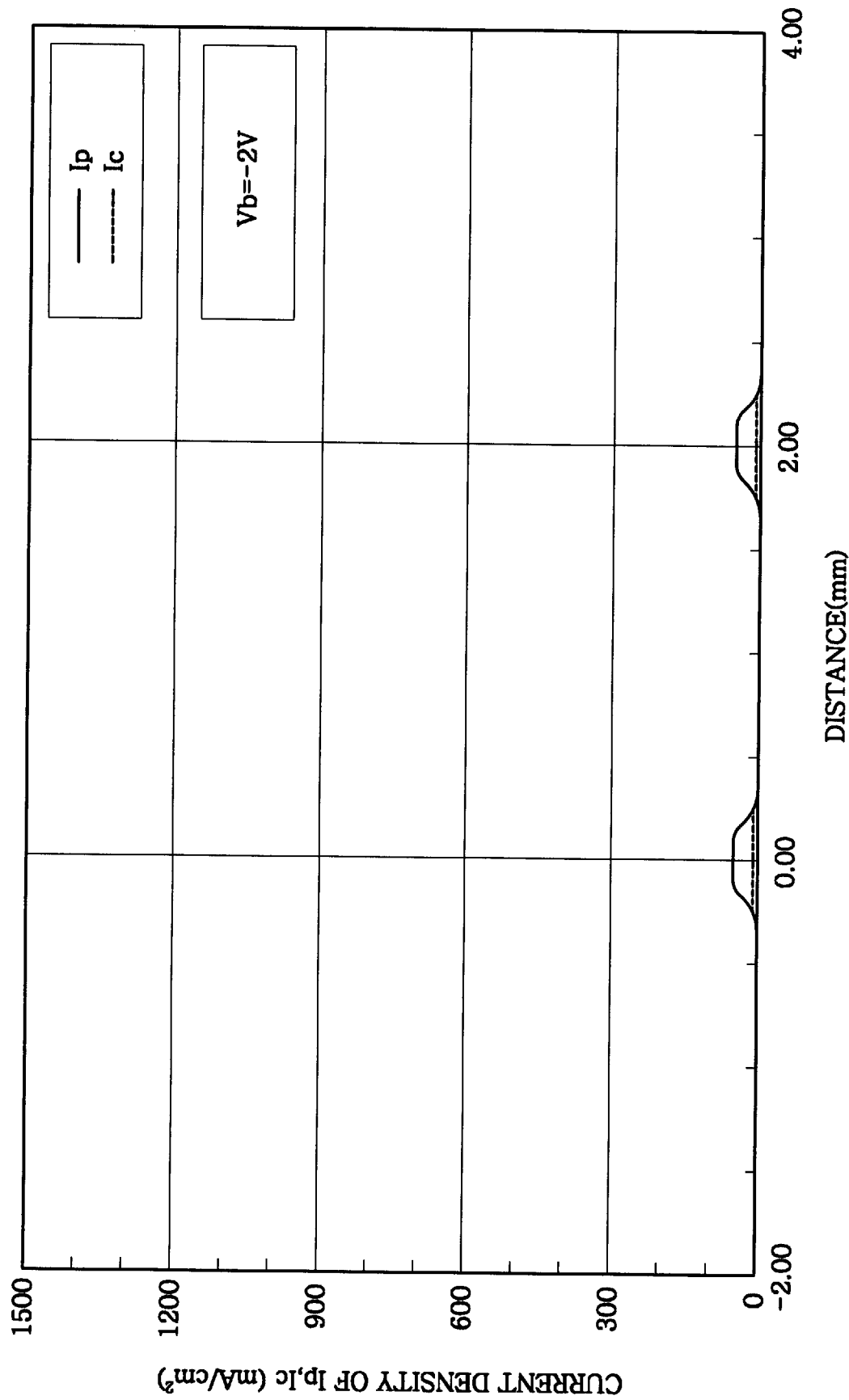

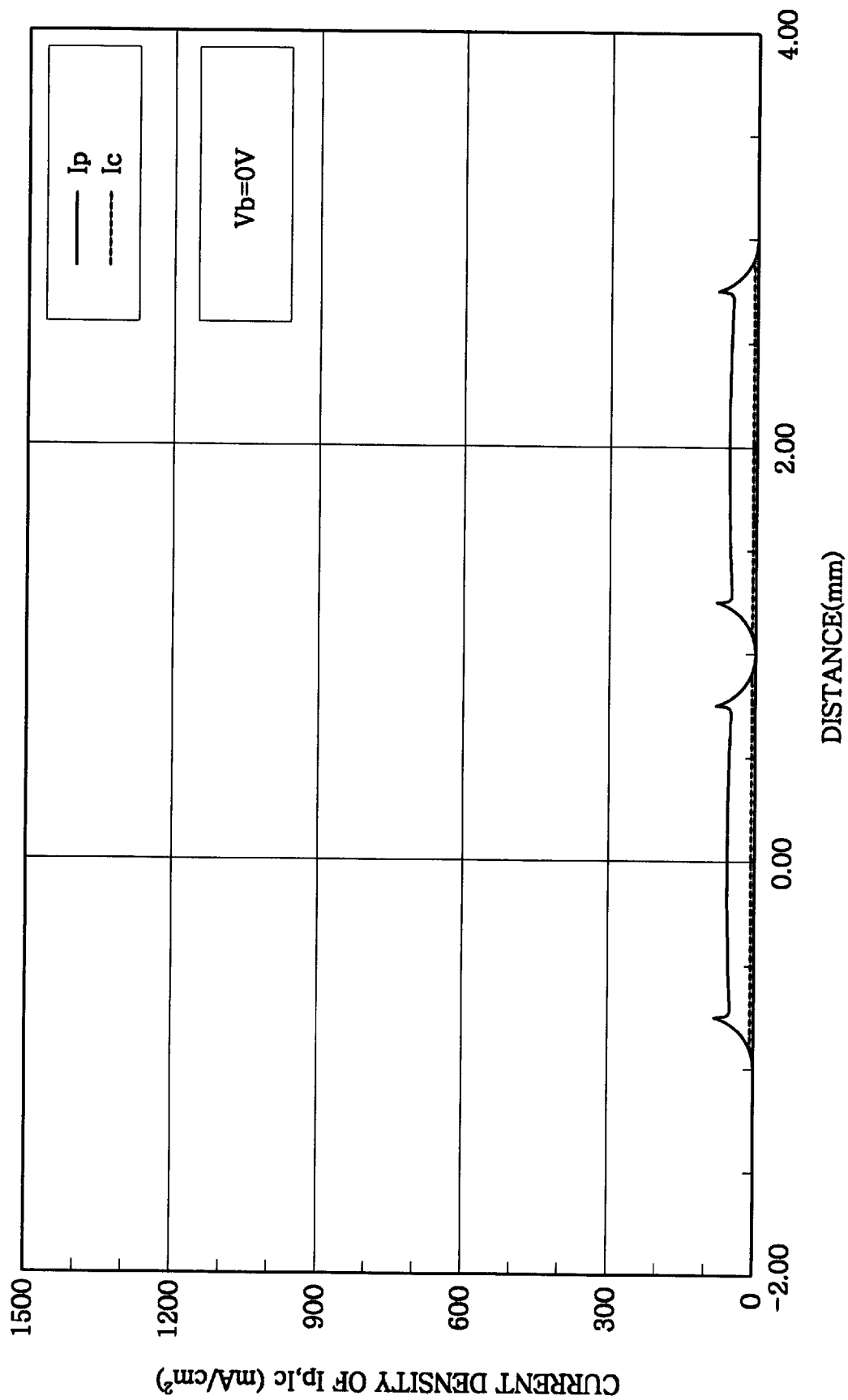

FLUORESCENT DISPLAY DEVICE AND METHOD FOR DRIVING SAME

FIELD OF THE INVENTION

The present invention relates to a fluorescent display device and a method for driving same, wherein the device has anode electrodes having fluorescent layers formed thereon and control electrodes for controlling the electron emission from a filament installed therebetween.

BACKGROUND OF THE INVENTION

One type of conventional fluorescent display device is provided with anode electrodes, control electrodes and a filament disposed therebetween, wherein each anode electrode has a fluorescent layer formed thereon and the electron emission from the filament is controlled by varying the voltage applied to the control electrodes.

FIGS. 5A and 5B set forth a structure of such a conventional fluorescent display device. FIG. 5A is a plan view depicting the arrangement of anode electrodes, control electrodes and a filament. FIG. 5B sets forth a cross sectional view taken along Z–Z' of FIG. 5A. In FIGS. 5A and 5B, there are illustrated a back plate 51 of the fluorescent device, control electrodes (back plate electrodes) 551 to 555 formed on the back plate 51, a front plate 52, anode electrodes 561 to 565 formed on the front plate 52, the anode electrodes 561 to 565 respectively having fluorescent layers 571 to 575 coated thereon, and a filament 53 tightly hanged between the anode electrodes 561 to 565 and the control electrodes 551 to 555 by two supporting members 54 and 54' disposed on the back plate 51.

When a control electrode, e.g., 552, is biased to have a voltage, e.g., 25V, higher than the one applied to the filament 53, electrons emitted from the filament 53 are prevented from arriving at its corresponding anode electrode, e.g., 562. However, a low voltage, e.g., 12V, is applied to a control electrode, electrons from the filament 53 can reach its corresponding anode electrode. For instance, when the control electrodes 552 and 555 are biased at 12V while other control electrodes 551, 553 and 554 are biased at 25V, the electrons emitted from the filament 53 can reach only the anode electrodes 562 and 565 corresponding to the control electrodes biased at the low voltage and therefore, only the fluorescent layers 572 and 575 on the anode electrodes 562 and 565 are allowed to emit light.

However, when a high voltage is applied to a control electrode to prevent electrons emitted from the filament from arriving at a corresponding anode electrode in the conventional fluorescent display device described above, electrons are, instead, emitted from the filament toward the control electrode biased at the high voltage, thereby resulting in a current flowing through he control electrode. For this reason, the prior art fluorescent display device unnecessarily consumes considerable power even when none of the anode electrodes are selected to be turned on to emanate light. Further, since electrons are emitted from the filament even when an anode electrode is not selected to be turned on to emit light, some of the emitted electrons may reach the unselected anode electrode, causing leakage luminescence to occur.

In addition, since the high voltage is required to suppress the electron emission from the filament toward the unselected anode electrode, a high voltage driving circuit becomes necessary.

SUMMARY OF THE INVENTION

It is, therefore, a primary object of the present invention to provide a slim fluorescent display device capable of reducing a power consumption, luminescence with a low driving voltage and minimizing a leakage luminescence with a low driving voltage.

In accordance with one aspect of the present invention, there is provided a fluorescent display device having control electrodes and anodes, each anode having an anode electrode and a fluorescent layer formed thereon, and a filament installed between the control electrodes and the anode electrodes, wherein when an anode is selected to be turned on to emit light, a first voltage is applied to the filament, a second voltage is applied to the selected anode and a third voltage is applied to a control electrode facing the selected anode, the second voltage being higher than the first voltage and the third voltage is not lower than the first voltage; and wherein when a voltage applied to a target control electrode is lower than a voltage applied to the filament by more than a predetermined voltage difference, an anode facing the target control electrode is riot turned on to emit light even when the second voltage is applied thereto.

In accordance with another aspect of the present invention, there is provided a method for driving a fluorescent display device having control electrodes and anodes, each anode having an anode electrode and a fluorescent layer formed thereon, and a filament installed between the control electrodes and the anode electrodes, wherein when an anode is selected to be turned on to emit light, a first voltage is applied to the filament, a second voltage is applied to the selected anode and a third voltage is applied to a control electrode facing the selected anode, the second voltage being higher than the first voltage and the third voltage is not lower than the first voltage; and wherein when a voltage applied to a target control electrode is lower than a voltage applied to the filament by more than a predetermined voltage difference, an anode facing the target control electrode is not turned on to emit light even when the second voltage is applied thereto.

BRIEF DESCRIPTION OF THE DRAWINGS

The above and other objects and features of the present invention will become apparent from the following description of the preferred embodiments given in conjunction with the accompanying drawings, wherein:

FIGS. 2A to 2E respectively illustrate a current density curve of an anode electrode current $I_p$ and that of a control electrode current $I_c$ obtained by conducting the electric field analysis as a function of the control voltage Vb by using the test fluorescent display device shown in FIG. 1;

DETAILED DESCRIPTION OF THE PREFERRED EMBODIMENTS

Figure 1:
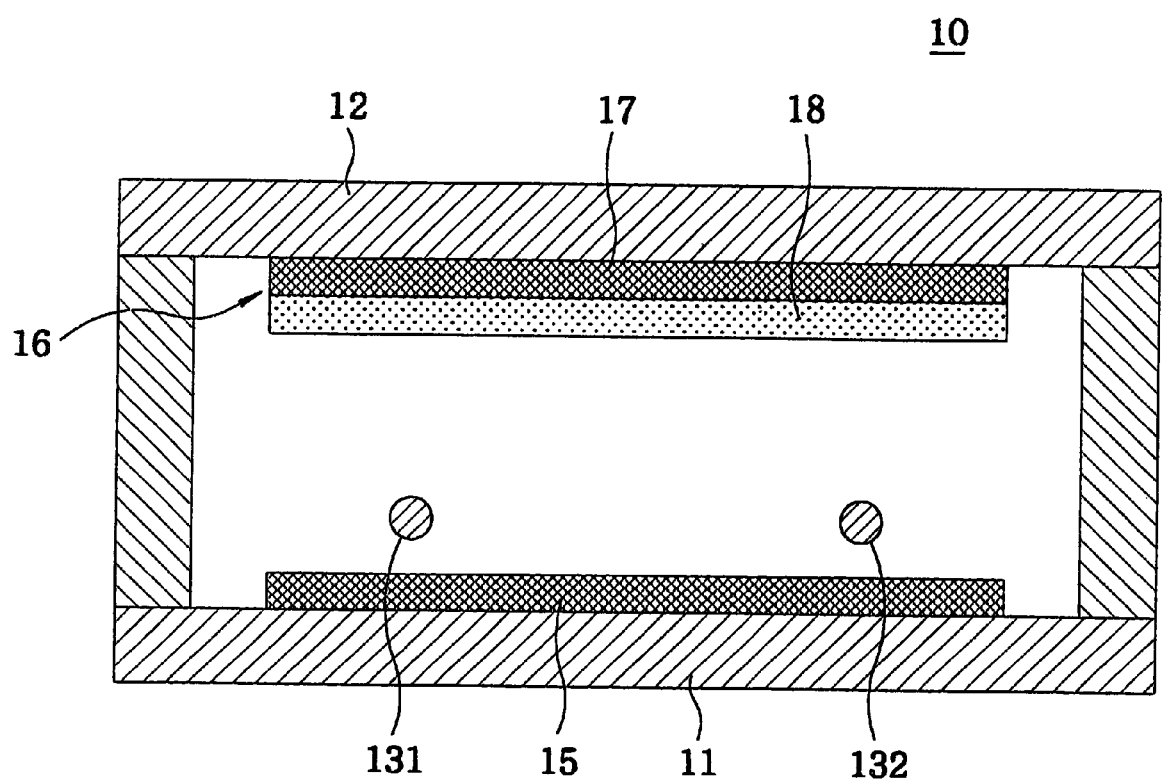
FIG. 1 shows a cross sectional view of a test fluorescent display device used in conducting an electric field analysis of a fluorescent display device to the present invention.
Figure 2C:
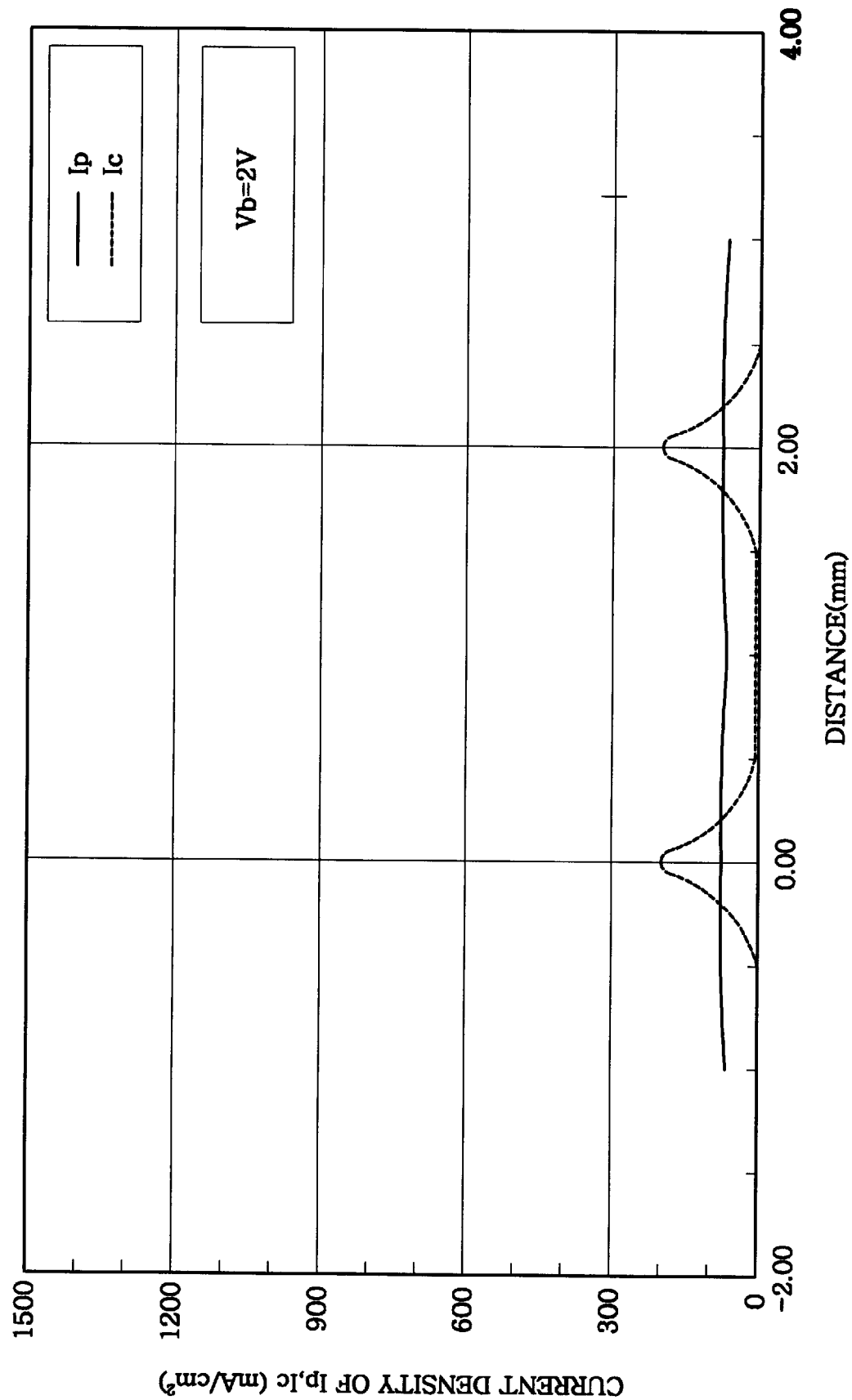
Figure 2D:
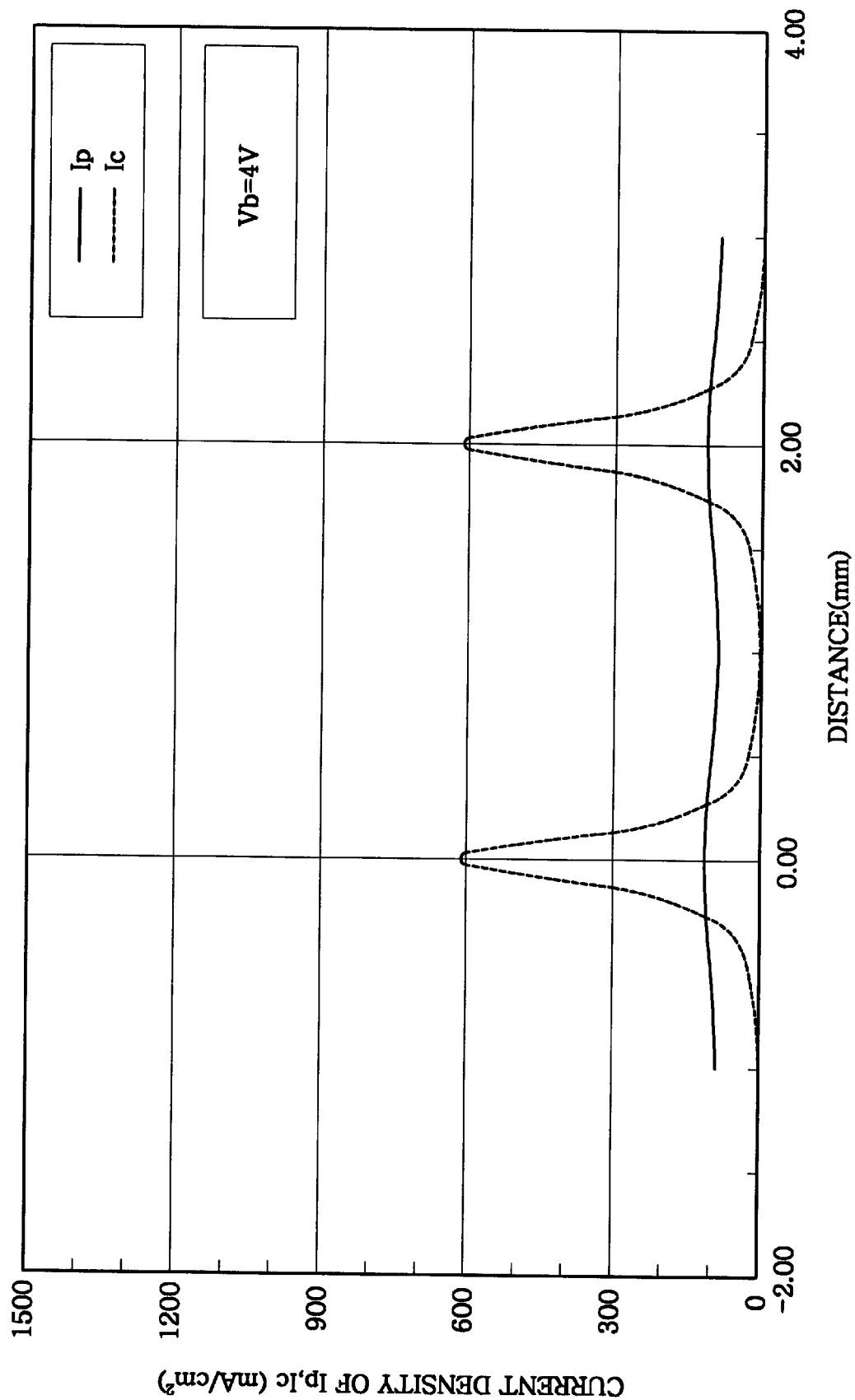
Figure 2E:
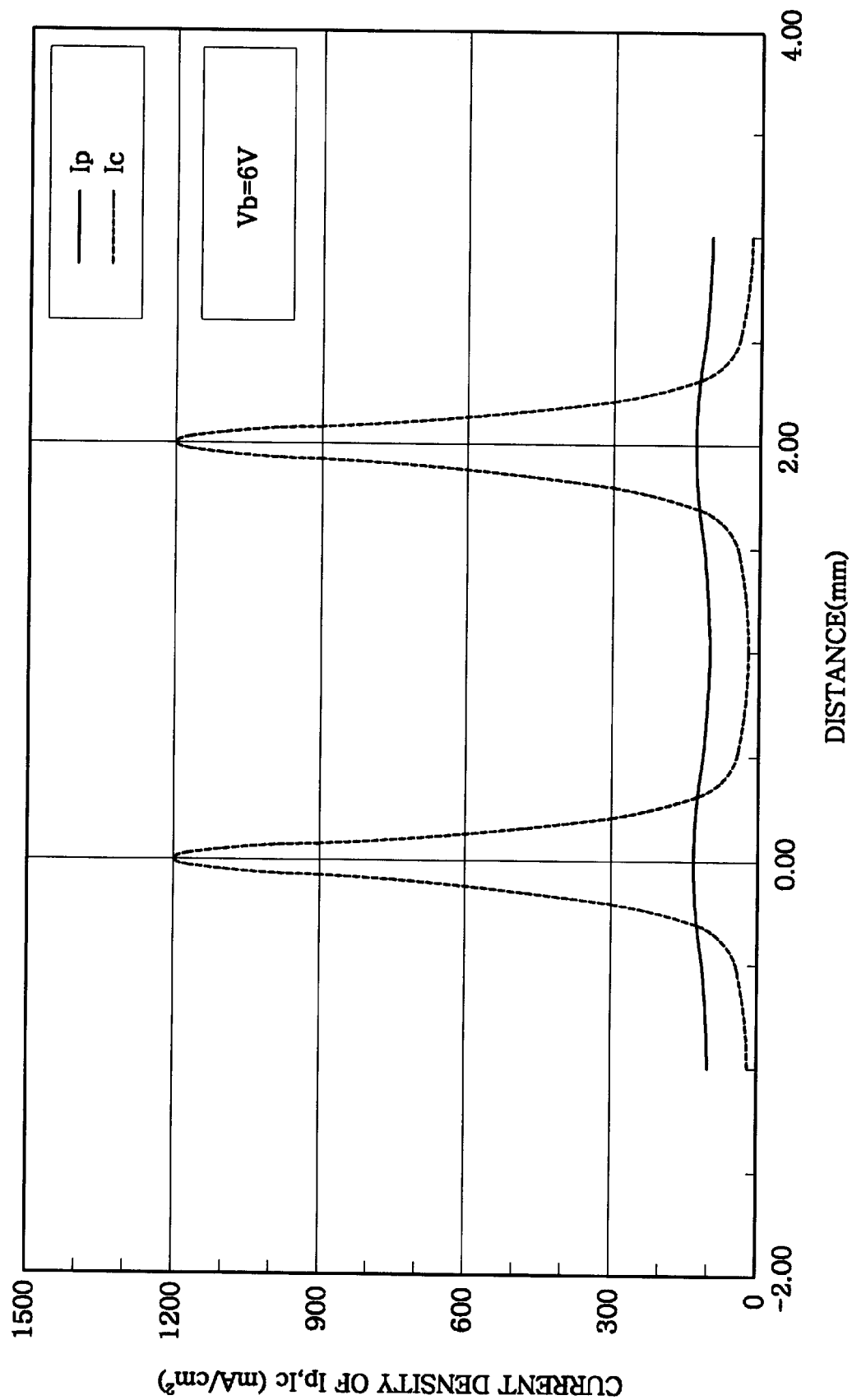

FIG. 1 shows a cross sectional view of a test fluorescent display device 10 used in conducting an electric field analysis of a fluorescent display device of the present invention. The test fluorescent display device 10 includes a glass back plate 11, a control electrode 15 formed on the glass back plate 11, a glass front plate 12, an anode 16 having an anode electrode 17 formed on the front plate 12 and a fluorescent layer 18 deposited on the anode electrode 17, and filaments 131 and 132 installed between the anode 16 and the control electrode 15.

The width of the control electrode 15 and that of the anode electrode 17 were 4 mm, respectively; the spacing between the control electrode 15 and the filaments 131, 132 was 0.15 mm; the spacing between the filaments 131, 132 and the anode electrode 17 was 0.9 mm; and the distance between two filaments 131 and 132 was 2 mm. The voltage applied to the anode electrode 17 was 12V and that applied to the filaments 131 and 132 was 0V. In the electric field analysis by using the test fluorescent display device 10, the voltage Vb to the control electrode 15 was used as an experimental parameter.

Each of FIGS. 2A to 2E illustrates a current density curve of an anode electrode current $I_p$ (represented as a solid line) and that of a control electrode current $I_c$ (represented as a dotted line) obtained by conducting the electric field analysis as a function of the control voltage Vb by using the test fluorescent display device 10. The vertical and the horizontal axis in the figures represent the current density and the horizontal distance along the control and the anode electrode 15 and 17, respectively. In the horizontal axis, the point values 0.00 and 2.00 correspond to the locations of the filaments 131 and 132, respectively.

In the experiment, it was found that no noticeable current flow was detected at the anode and the control electrode 17 and 15 when the control voltage Vb was less than −2V, e.g., −4V and −6V (not shown). When Vb=−2V, lower than the filament voltage of 0V, the control electrode current $I_c$ was negligible and a small amount of anode electrode current $I_p$ was detected at the regions close to the filaments (FIG. 2A). When the control voltage was equal to the filament voltage, the control electrode current $I_c$ remained negligible but the anode electrode current $I_c$ was detected at the broadened regions near the filaments (FIG. 2B). When the control voltage Vb was higher than the filament voltage, e.g., 2V, 4V and 6V, the anode electrode current density was nearly constant throughout the full width (4 mm) of the anode electrode 17 and the control electrode current $I_c$ flowed through the regions close to the filaments 131 and 132 (0.00 and 2.00 of the horizontal axis). It can be seen from the experiments described above that electron emission from the filaments 131 and 132 is effectively suppressed when the applied control voltage Vb is lower than the filament voltage.

Figure 3A:
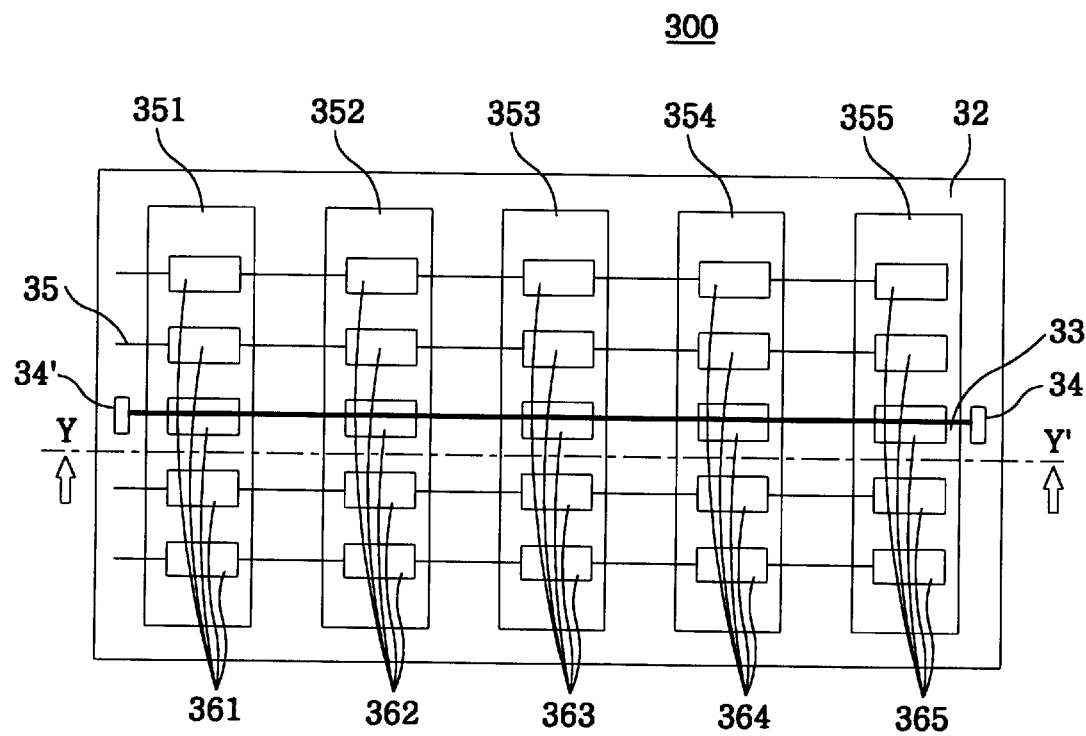
FIGS. 3A and 3B depict a structure of a fluorescent display device in accordance with a preferred embodiment of the present invention.
Figure 3B:
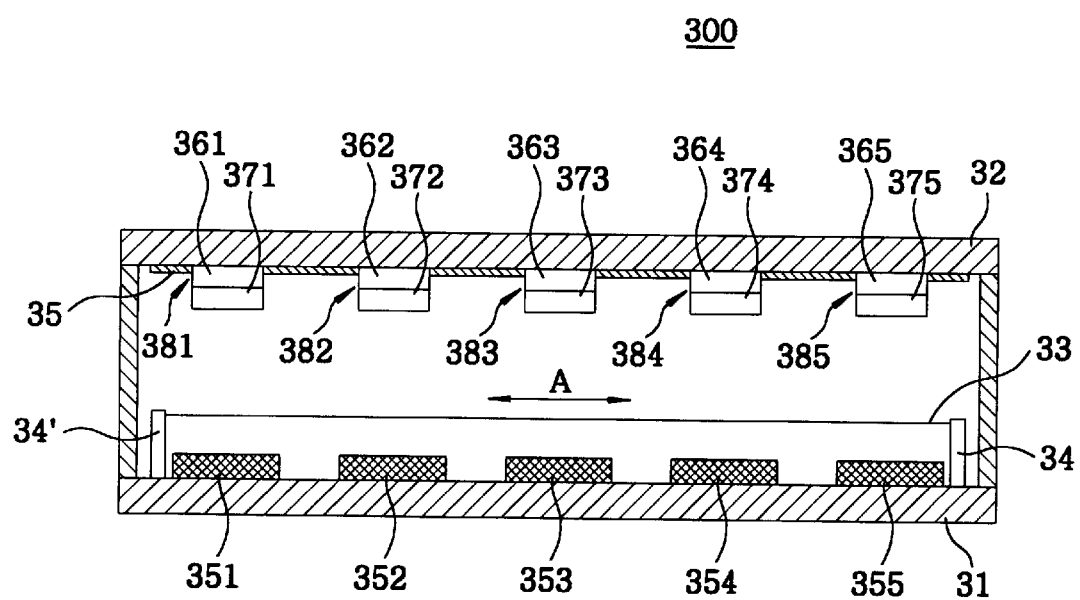

FIGS. 3A and 3B depict a structure of a fluorescent display device 300 in accordance with a preferred embodiment of the present invention. FIG. 3A is a plan view illustrating the arrangement of anode electrodes, control electrodes (back plate electrodes) and a filament. FIG. 3B presents a cross sectional view taken along Y–Y' of FIG. 3A.

The fluorescent display device 300 includes a glass back plate 31, control electrodes 351 to 355 formed on the glass back plate 31, a glass front plate 32, anodes 381 to 385 respectively having anode electrodes 361 to 365 formed on the front plate 32 and fluorescent layers 371 to 375 coated on the anode electrodes 361 to 365, and a filament 33 tightly hanged between the anodes 381 to 385 and the control electrodes 351 to 355 by two supporting members 34 and 34' which are disposed on the glass back plate 31.

The anodes 381 to 385 and the control electrodes 351 to 355 are arranged in a matrix form and a set of five anode electrodes in each row are connected in series by a corresponding wiring 35 as shown FIG. 3A. The control electrodes 351 to 355 face corresponding sets of columned anodes 361 to 365, respectively.

As described above, electron emission from the filament 33 biased at 0V is prevented if a negative voltage is applied to the control electrodes 351 to 355. If a positive voltage, e.g., 2V, is applied to the control electrode 353 in this state, a part of filament 33 corresponding to the control electrode 353, i.e., the portion A of the filament 33 located above the control electrode 353 in FIG. 3B is affected by the positive voltage of the control electrode 353 and electrons can be emitted from the part A of the filament 33 to an anode electrode biased at a positive voltage, e.g., 12V, among the set of anode electrodes 363.

Figure 4A:
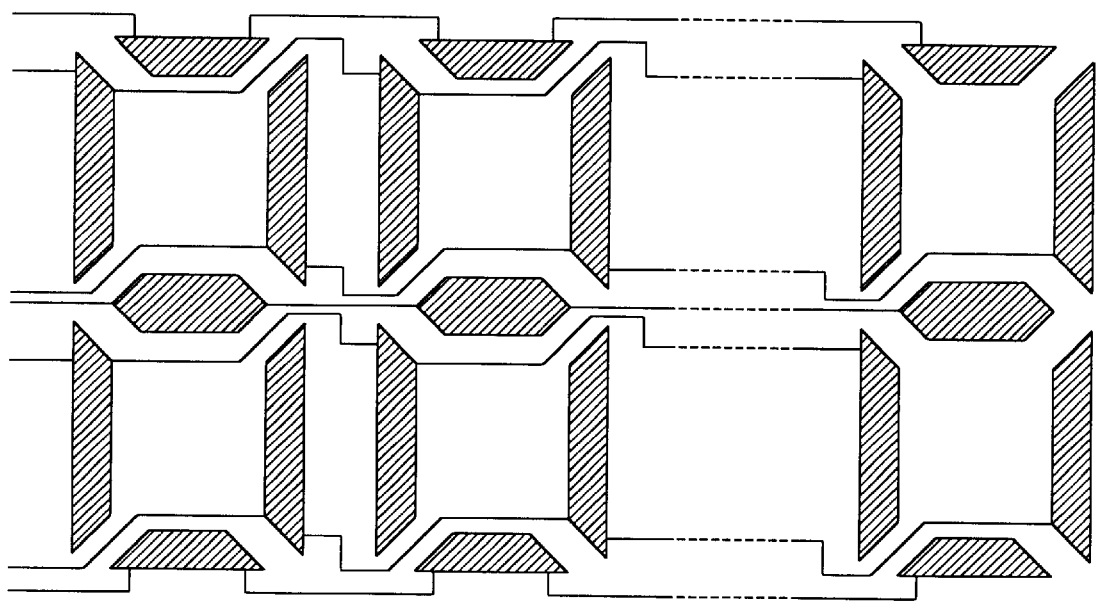
FIGS. 4A and 4B present an exemplary patterns of anode electrodes in accordance with a preferred embodiment of the present invention.
Figure 4B:
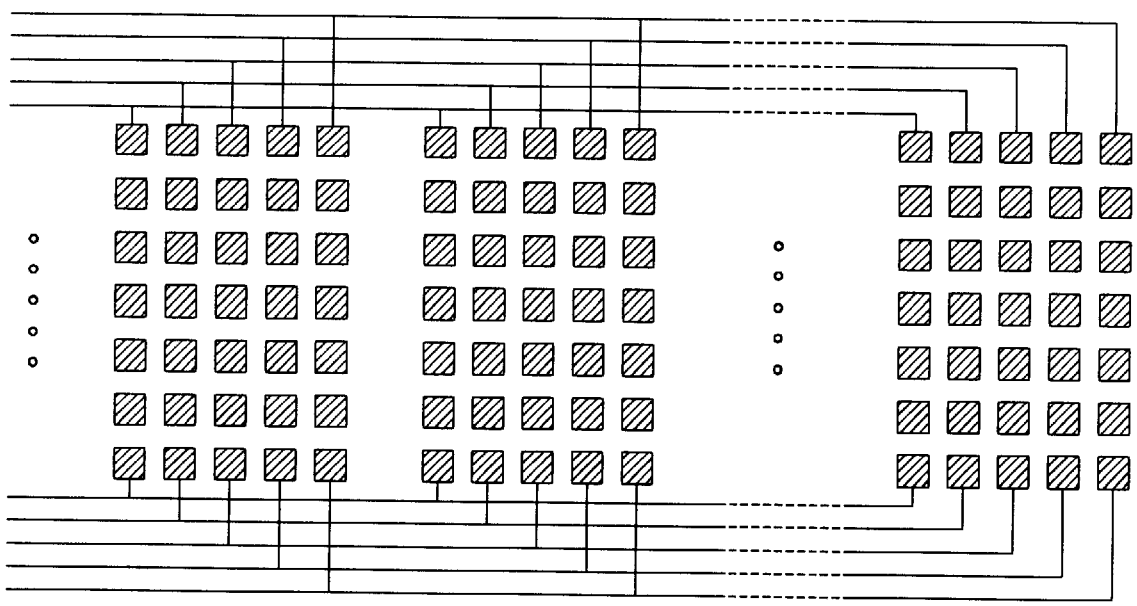
Figure 5A:
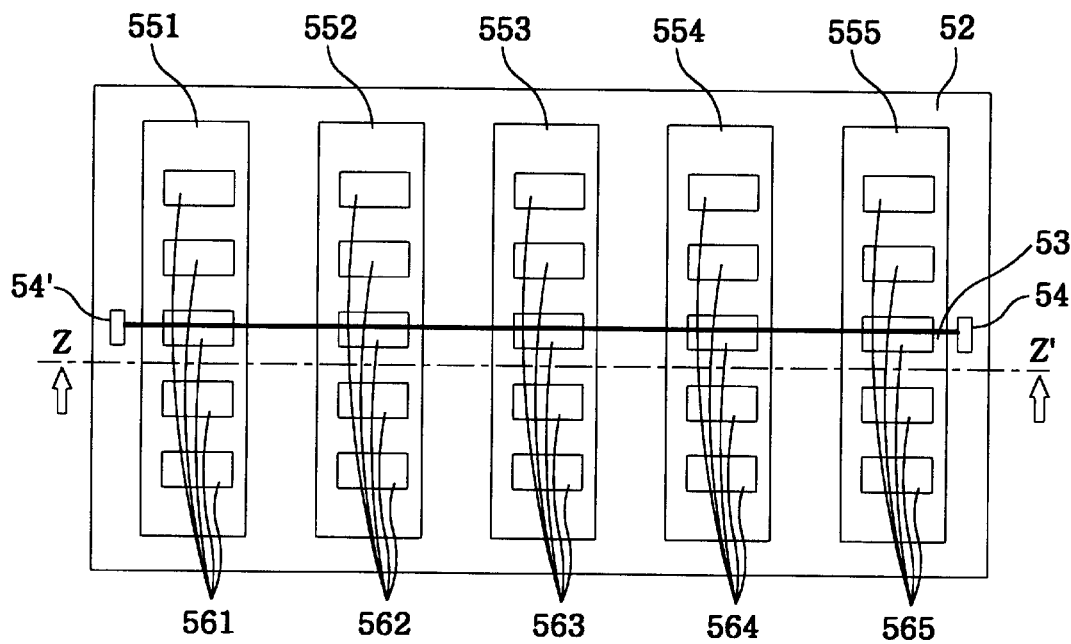
FIGS. 5A and 5B set forth a structure of a conventional fluorescent display device.
Figure 5B:
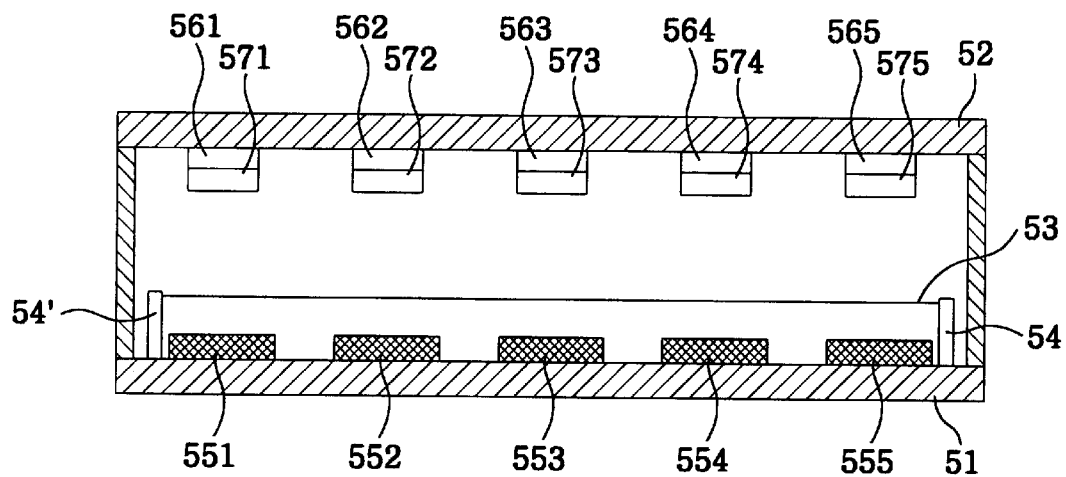

FIGS. 4A and 4B present an exemplary patterns of anode electrodes of the present invention. FIG. 4A represents an exemplary anode pattern of seven segments. In FIG. 4A, each anode electrode cell having seven segments faces a corresponding control electrode (not shown) as in FIGS. 3A and 3B. Each of the seven segments in each anode electrode cell is connected to corresponding segments of other anode electrode cells through a conductor wiring as shown in FIG. 4A.

FIG. 4B depicts an exemplary 7×5 dot patterned anode electrodes. Each anode electrode cell having 7×5 dot segments faces a corresponding control electrode (not shown) in a manner as in FIGS. 3A and 3B. Each dot segment in each anode electrode cell is connected to corresponding dot segments in other anode electrode cells through a conductor wiring as shown in FIG. 4B. In FIG. 4B, conductor wirings only for the dot segments in the first and the seventh row are illustrated for the sake of simplicity.

In the examples shown in FIGS. 4A and 4B, both the control electrodes and the anode electrodes are arranged in a matrix form. However, it should be noted that various electrode patterns can be adopted in the fluorescent display device of the present invention. Further, the fluorescent display device of the present invention can be employed in any types of display devices, including but not limited to a direct view type and an indirect view type display device. The front plate and the back plate may be made of a transparent or opaque material as long as it is an insulating material. However, at least one of the plates, i.e., a plate toward the viewing side should be transparent.

The anode electrodes and the control electrodes can be either transparent or opaque. However, at least the electrodes on the plate to the viewing side ought to be transparent. The transparent electrodes may be formed of a transparent conductive material or may be of a through hole type made of an opaque conducting material such as aluminum and have through holes therein for letting light pass therethrough.

The shape of the control electrodes of the present invention may be any types used in the art, including but not limited to a strip, wire, of mesh type. The filament can be arranged parallel or non-parallel to the running direction of the anode and the control electrodes. It is possible high voltage sustaining poles can be used, if necessary, in the fluorescent display device of the present invention.

As described above, in the fluorescent display device of the present invention, when none of the anodes are selected to be turned on to emit light, a negative voltage is applied to all the control electrodes to prevent electrons from being emitted from the filament and if an anode is selected to be turned on, a positive electric potential is applied only to a corresponding control electrode facing the selected anode to thereby allow the filament to emit electrons to the selected anode. As a result, in accordance with the present invention, it becomes possible to reduce power consumption and to ameliorate the leakage luminescent problem of the prior art with decreased driving voltage. Further, by installing the control electrodes close to the filament as in the preferred embodiment of the present invention, the fluorescent display device of the present invention can be made to be thinner than the prior art fluorescent display device and the electron emission from the filament can be effectively controlled by the control electrodes.

While the present invention has been described with respect to certain preferred embodiments only, other modifications and variations may be made without departing from the scope of the present invention as set forth in the following claims.

What is claimed is:

1. A fluorescent display device having control electrodes and anodes, each anode having an anode electrode and a fluorescent layer formed thereon, and a filament installed between the control electrodes and the anode electrodes, wherein when an anode is selected to be turned on to emit light, a first voltage is applied to the filament, a second voltage is applied to the selected anode and a third voltage is applied to a control electrode facing the selected anode, the second voltage being higher than the first voltage and the third voltage is not lower than the first voltage; and wherein when a voltage applied to a target control electrode is lower than a voltage applied to the filament by more than a predetermined voltage difference, an anode facing the target control electrode is not turned on to emit light even when the second voltage is applied thereto.

2. The device of claim 1, wherein the control electrodes and the anode electrodes are arranged in a matrix form.

3. The device of claim 1, wherein a spacing between the control electrodes and the filament is shorter than that between the anode electrodes and the filament.

4. A method for driving a fluorescent display device having control electrodes and anodes, each anode having an anode electrode and a fluorescent layer formed thereon, and a filament installed between the control electrodes and the anode electrodes, wherein when an anode is selected to be turned on to emit light, a first voltage is applied to the filament, a second voltage is applied to the selected anode and a third voltage is applied to a control electrode facing the selected anode, the second voltage being higher than the first voltage and the third voltage is not lower than the first voltage; and wherein when a voltage applied to a target control electrode is lower than a voltage applied to the filament by more than a predetermined voltage difference, an anode facing the target control electrode is not turned on to emit light even when the second voltage is applied thereto.

* * * * *